Jan. 30, 1968

KEIZO SHIMANO 3,366,206

BICYCLE HUB HAVING A BUILT-IN THREE-STAGE SPEED
CHANGE MECHANISM EQUIPPED WITH A COASTER BRAKE

Filed May 13, 1966

Inventor
Keizo SHIMANO
By Wenderoth, Lind & Ponack
Attorneys

Inventor
Keizo SHIMANO
By Wenderoth, Lind & Ponack
attorneys

Jan. 30, 1968

KEIZO SHIMANO 3,366,206

BICYCLE HUB HAVING A BUILT-IN THREE-STAGE SPEED
CHANGE MECHANISM EQUIPPED WITH A COASTER BRAKE

Filed May 13, 1966

Inventor
Keizo SHIMANO

By Wenderoth, Lind & Ponack
attorneys

United States Patent Office 3,366,206
Patented Jan. 30, 1968

3,366,206
BICYCLE HUB HAVING A BUILT-IN THREE-STAGE SPEED CHANGE MECHANISM EQUIPPED WITH A COASTER BRAKE
Keizo Shimano, Sakai, Japan, assignor to Shimano Kogyo Kabushiki Kaisha, Sakai, Japan
Filed May 13, 1966, Ser. No. 549,858
Claims priority, application Japan, June 15, 1965, 40/35,910
1 Claim. (Cl. 192—6)

This invention relates to a bicycle hub having a built-in three-stage speed change mechanism, including a coaster brake. The invention has for its object to provide an improved bicycle hub having an improved speed change mechanism disposed within the hub shell, which is adapted to be readily set for normal speed drive, low speed drive or high speed drive as desired, and wherein the coaster brake may be applied by reversed operation of the bicycle pedals for a small angle, without any hindrance. Other and further objects of the invention will appear from the following description and the accompanying drawings.

Figure 1:
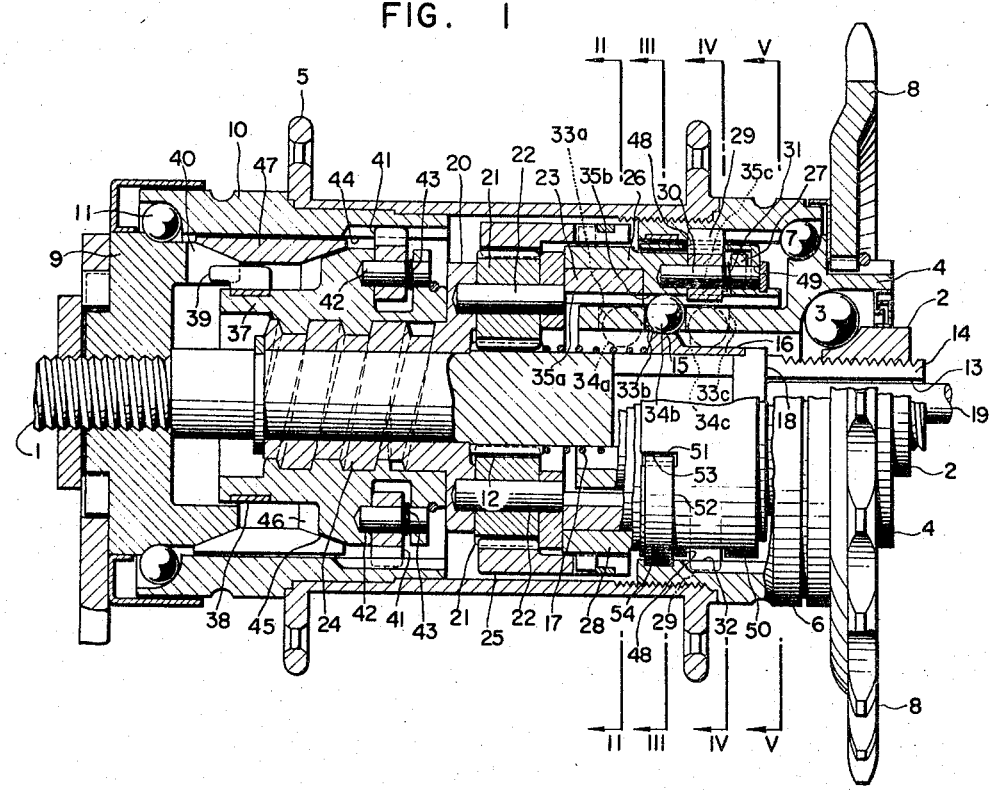
FIGURE 1 is a longitudinal section of a bicycle hub having a built-in three stage speed change mechanism, including a coaster brake, constructed according to the present invention, showing various parts in the normal speed position.
Figure 2:
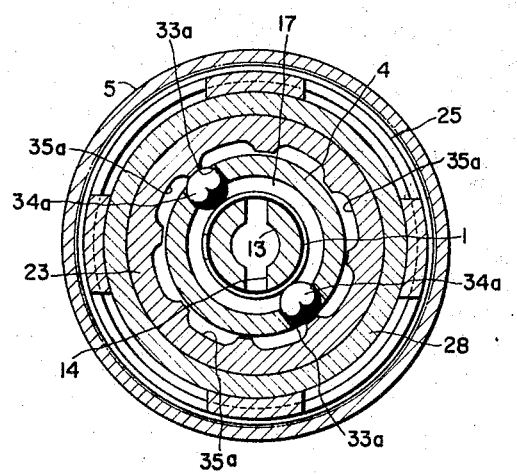
FIGURES 2 to 5 are cross-sectional views taken along lines II—II, III—III, IV—IV, and V—V of FIG. 1, respectively.
Figure 3:
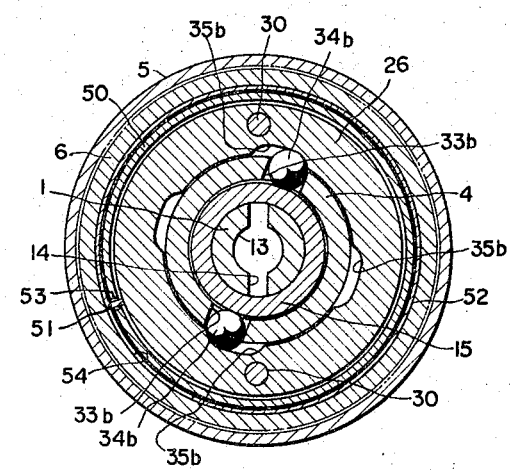

Referring to the drawing, 1 designates a rear fixed or dead axle of a bicycle having a right hand ball race cone 2 for the bearing balls 3, of which an outer race is formed on a driving sleeve 4. A hub shell 5 has the right hand end portion 6 mounted on said driving sleeve 4 by means of bearing balls 7, for which the inner ball race is formed on the driving sleeve 4. 8 is a sprocket wheel fixedly mounted on the enlarged right hand end portion of the driving sleeve 4. Screwed onto the left hand end of the dead axle 1, there is an end plate 9, on which an extension sleeve 10 of the hub shell is mounted through the intermediary of bearing balls 11, as shown.

On the mid portion of the rear axle 1, there is mounted a sun gear 12, and in the right hand end portion there is provided a central bore 13 having diametrically extending slots 14 (FIGS. 2–5). Surrounding said bored portion of the axle, there is mounted a change-over ring 16 having an annular projection 15 which is biased by means of a spring 17. Said ring 16 is abutting against a contact piece 18 in the slots 14, which contact piece 18 being adapted to be pressed by means of a push rod 19 inserted into the central bore 13. This push rod 19 is adapted to be actuated from a control member to be described below, so that the annular projection 15 contacting with the inner end of the driving sleeve 4 is moved axially.

Figure 4:
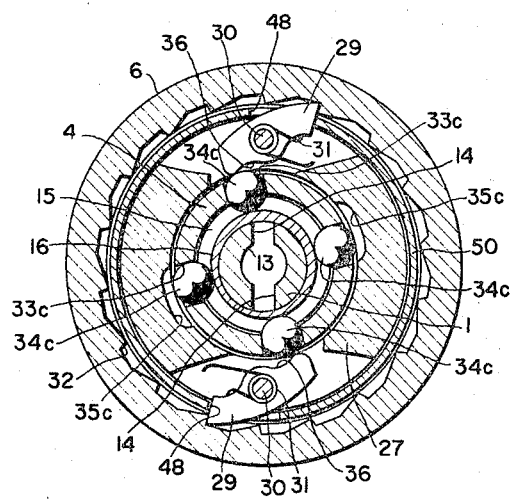
Figure 5:
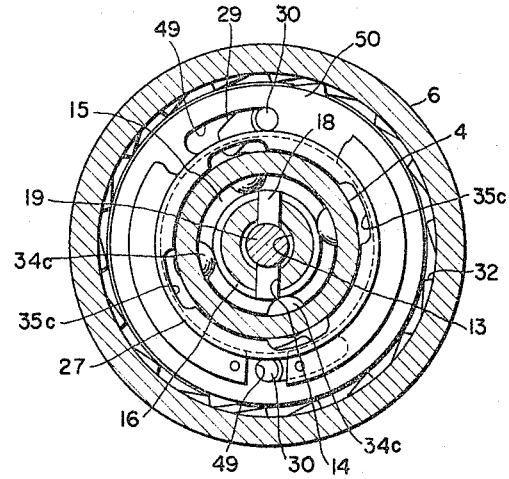

A planetary carrier 20 carries a plurality of pins 22 of planetary pinions 21 meshing with the sun gear 12. Said carrier 20 has a rightwardly extending extension ring 23 which is surrounding the left hand portion of the driving sleeve 4, leaving a suitable space therebetween. At the left hand end, said carrier 20 has a screw threaded cylindrical extension 24. An internal gear 25 meshing with said planetary pinions 21 is at its right hand end operatively connected with an annular frame 28 having a driven member 26 and a driving pawl mounting 27, the latter having driving pawls 29, each pivotally mounted around a pin 30, as shown in FIGURE 4. Each of said driving pawls 29 is biased outwardly by means of a spring 31. The driving pawls 29 are meshing with an internal ratchet wheel 32 formed on the right hand end extension 6 of the hub shell 5. It is to be understood that, insofar as the driving pawl is not suppressed from operation by a control means to be described below, said driving pawls transmit a rotation to the hub shell 5 according to the rotation of the internal gear 25 in the forward direction.

The driving sleeve 4 is provided with holes 33a (FIG. 2) at the position opposite to the extension ring 23 of the planet carrier 20, and with holes 33b (FIG. 3) at the position opposite to the driven member 26 of the driving frame 28 connected to the internal gear 25, and with holes 33c (FIG. 4) at the position opposite to the driving pawls 29 on the mounting 27. In said holes 33a, 33b and 33c, there are loosely inserted balls 34a, 34b and 34c, respectively. The driven ring 23 has a plurality of depressions 35a adapted to receive the balls 33a. The driven member 26 has a plurality of depressions 35b adapted to receive the balls 34b, and the pawl mounting ring 27 has a plurality of depressions 35c adapted to receive the balls 34c. When the balls 34a, 34b and 34c are pushed outwardly by the annular projection 15 of the change-over ring 16, said balls are partly received by the depressions 35a, 35b and 35c, respectively. The driving pawls 29 normally engaging with the internal ratchet wheel 32 will be disengaged therefrom only where the balls 34c are pushed outwardly by the annular projection 15 of the change-over ring 16, so that the tails 36 of the pawls 29 are depressed outwardly by the outwardly coming balls 34c against the action of the spring 31. In the position shown in FIGS. 1 and 3, the balls 34b are in the position outwardly pressed by the change-over ring 15 into the depressions 35b, so that the driven member 26 is in the operable connection with the driving sleeve 4 as well as the pawl mounting ring 27 which is fixedly mounted thereto, and the driving pawls 29 are held in the driving position as shown in FIG. 4. This is the normal speed transmitting position.

Figure 8:
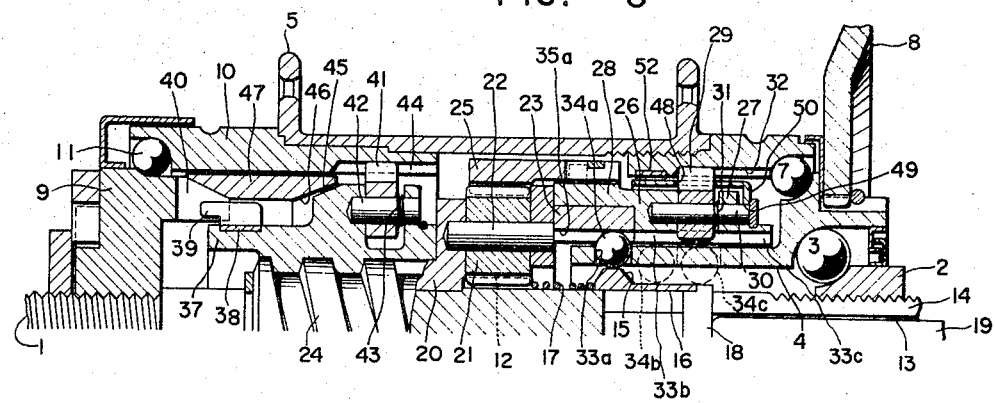
FIGURE 8 is an upper half sectional view similar to FIGURE 1, but showing various parts in the high speed position.

When the balls 34a are pushed outwardly by the action of the change-over ring 16 into engagement with the driven ring 23 which is fixed to the planet carrier 20, as shown in FIG. 8, the transmission of high speed rotation will be made through the planet pinions 21, the internal gear 25, the driving frame 28 and the driving pawls 29 to the hub extension 6.

Figure 9:
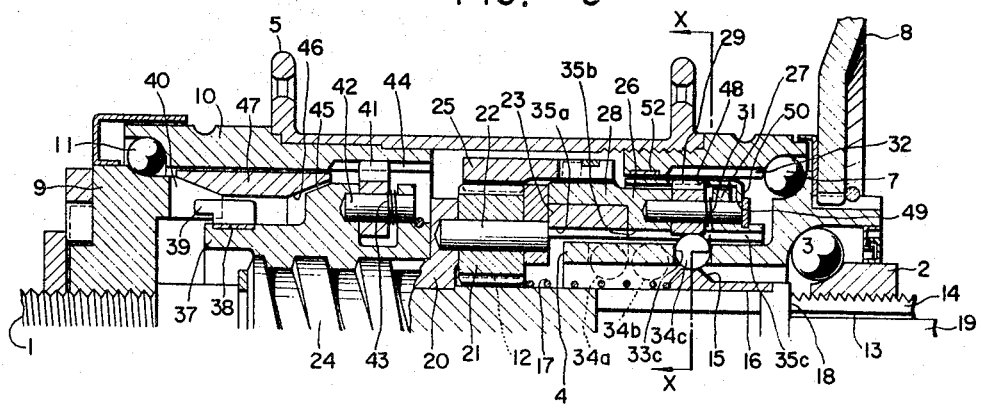
FIGURE 9 is an upper half sectional view similar to FIGURE 1, showing various parts in the low speed position.
Figure 10:
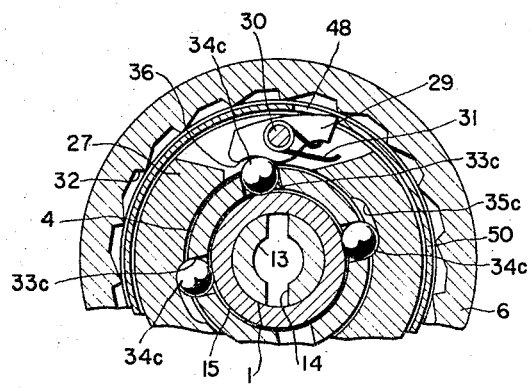
FIGURE 10 is a cross-sectional view taken along line X—X of FIGURE 9.

When the balls 34c are pushed outwardly as shown in FIGS. 9 and 10, the driving pawls 29 are disengaged from the internal ratchet wheel 32 and, on the other hand, by means of the other two balls 34c in the same row the transmission of low speed rotation will be effected through the pawl mounting ring 27, the driving frame 28, the internal gear 25 and the planet pinions 21 to the planet carrier 20.

By operating the change-over ring 16 in axial direction to hold the driving pawls 29 in the position disengaged from the internal ratchet wheel 32 to obtain the low speed drive transmission through the planet carrier 20, it is preferable to utilize a component of the coaster brake mechanism to be described below. For the purpose, in the embodiment shown, a brake member 37 is thread fitted with the screw threaded cylindrical extension 24 of the planet carrier 20. An elastic ring 38 wound around the left hand end portion of said brake member 37 is fitted under frictional contact therewith, and an ear 39 projecting from said frictional ring is engaged by a socket 40 provided in the end plate 9. By said arrangement, while the brake member 37 per se is prevented from free rotation the same member 37 may be rotated in unison with the screw threaded extension 24 according to the rotation of the planet carrier 20. At the right hand end portion of the brake member 37, there is provided a plurality of driving pawls 41 pivotally mounted on pins 42 and normally held in the erected position by means of a spring 43. On the hub extension sleeve 10 an internal ratchet wheel 44 is formed, with which said driving pawls 41 engage. As the brake member 37 moves in axial direction, the internal ratchet wheel 44 is made sufficiently wide taking into consideration said axial movement of the brake member. It is so arranged that the hereinbefore mentioned driving pawls 29 are in engagement with the internal ratchet wheel 32 for the normal speed and high speed positions, the driving pawls 41 run freely, in the reverse direction relative to said driving pawls 29, over the internal ratchet wheel 44 and, on the other hand, that when the driving pawls 29 are suppressed from the driving engagement in the low speed position the driving pawls 41 are operatively engaged with the internal ratchet wheel 44.

In the above mentioned three stage speed change mechanism, to apply brake under any speed position the sprocket wheel 8 is rotated in reverse direction for a small angle as is conventional in this type of the speed change mechanism, so that the brake member 37 is moved leftwardly. For preventing free rotation of the hub shell 5 by such axial movement of the brake member 37, this brake member is provided with a taper face 45 and, beween said taper face 45 of the brake member and the hub shell extension 10, there is inserted a brake ring 47 having a taper face 46 co-operating with said taper face 45 of the brake member 37.

Figure 6:
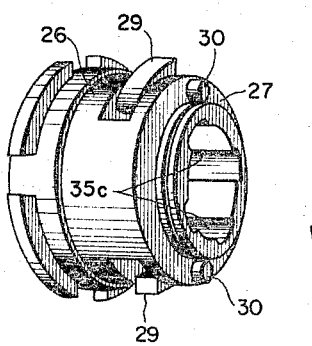
FIGURE 6 is a perspective view of a cage holding driving pawls for obtaining the normal and high speed drive.
Figure 7:
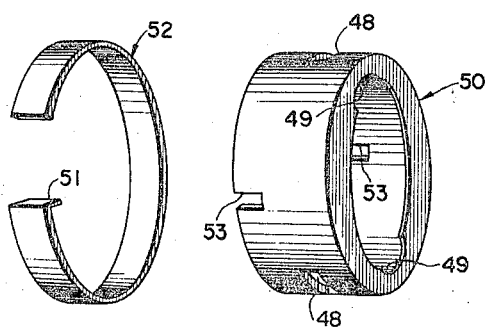
FIGURE 7 shows in detail a control member for said pawls.

In applying brake by the reverse rotation of the sprocket wheel 8 in the above manner, it may happen that at the end of the reverse rotation the driving pawls 29 stop with their tips engaging with the tips of the ratchet teeth. If such position occurs, it might become impossible to effect forward rotation for releasing the brake action before starting next drive. Such disadvantage is unavoidable with respect to the driving pawls 29 and, for the purpose of removing such disadvantage, the following means is provided. The pivot pin 30 of each driving pawl 29 is projected from the right hand end of the driven member 26 extending from the annular frame 28 as shown in FIG. 6. The driven member 26 of the annular frame 28 is surrounded by an annular control member 50. As shown in FIG. 7, the control member 50 has two windows 48, through each of which the tip of the driving pawl 29 is projected, and has an inwardly projecting finage at the right hand end thereof, which is provided with two arcuate recesses 49. Each recess 49 is receiving the projected end of the pivot pin 30 of the driving pawl 29 and is of such dimension that a limited rotation of the control member 50 is allowed. On said control member 50, there is provided a spring snap ring 52 having a smaller axial dimension than the control member and having a hook 51 adapted to engage with a recess 53 formed in the control member for preventing the reverse rotation thereof. As shown in FIG. 1, the outer face of said snap ring 52 is in engagement with an inner face 54 formed on the inner wall of the right hand extension 6 of the hub shell. Said parts are so arranged that when the driving pawls 29 in their erected position tend to drive the control member 50 in the reverse direction caused by the reverse rotation of the annular frame 28 when the bicycle pedals are actuated in the reverse direction, the tensioning action of the spring snap ring 52 against the inner race of the hub extension 6 serves to prevent such reverse rotation of the control member 50, but allowing the limited reverse movement of the annular frame 28 having the extension 26 within the limit of the angle of play of the movement of the pivot 30 of the pawl 29 engaging with the oblong recess 49. During said reversed movement of the pivot 30 within the angle of play, the tip of the driving pawl 29 is positively retracted from the window 48 in the control member 50 into the normal position ready for next forward drive, except the low speed drive.

From the foregoing, it will be seen that according to the present invention desired three stage speed change may be readily attained by the provision of the mechanism located in the restricted space in the righthand end portion of the hub shell and actuated by the driving sleeve having the driving sprocket wheel, that desired brake action may be applied at the left hand end portion of the hub shell during any speed drive, and that any hindrance which might occur at the start of next forward drive after speed change operation may be effectively prevented by means of the positive control of the driving pawls in the speed change mechanism.

What I claim is:

1. A bicycle hub having a built-in three stage speed change mechanism and equipped with a coaster brake, comprising a hub shell having an internal ratchet wheel on the right hand end portion thereof, a rear dead axle, a driving sleeve surrounding said rear dead axle and having a sprocket wheel secured thereto, said driving sleeve being provided with a plurality of holes in which a plurality of balls are loosely inserted, a planetary gear mechanism having a planet pinion carrier having a rightwardly extending extension, a plurality of driving pawls pivotally mounted to said carrier extension, a control ring member mounted on said carrier extension and having a plurality of windows through which the tips of said driving pawls are adapted to be projected to engage with said internal ratchet wheel, a change-over ring slidably mounted on the said dead axle and having an annular projection adapted to selectively engage with said balls and to push them outwardly radially so as to hold the said driving pawls in inoperative position, a left hand cylindrical extension of said planet pinion carrier, a brake cylinder screw threaded with said left hand cylindrical extension and having an outer taper face, and a brake ring having an inner taper face adapted for frictional engagement with the outer taper face of said brake cylinder.

References Cited

UNITED STATES PATENTS

| 1,773,699 | 8/1930 | Wasbauer | 74—750 |
| 2,988,186 | 6/1961 | Dotter | 192—6 X |
| 3,102,436 | 9/1963 | Schuller | 74—750 |
| 3,113,472 | 12/1963 | Schwerdhofer | 74—750 |
| 3,114,442 | 12/1963 | Schwerdhofer | 192—6 |
| 3,122,226 | 2/1964 | Schuller et al. | 192—6 |

ROBERT M. WALKER, *Primary Examiner.*

ARTHUR T. McKEON, *Examiner.*